United States Patent
Parihar et al.

(10) Patent No.: US 10,341,933 B1
(45) Date of Patent: Jul. 2, 2019

(54) CONTROL OF RELAY BASE STATION SERVICE BASED ON MCS CAPABILITY OF ASSOCIATED UE-RELAY

(71) Applicant: Sprint Spectrum L.P., Overland Park, KS (US)

(72) Inventors: Vanil Parihar, Overland Park, KS (US); Sreekar Marupaduga, Overland Park, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 107 days.

(21) Appl. No.: 15/603,915

(22) Filed: May 24, 2017

(51) Int. Cl.
*H04W 40/22* (2009.01)
*H04W 40/04* (2009.01)
*H04W 88/04* (2009.01)

(52) U.S. Cl.
CPC .......... *H04W 40/22* (2013.01); *H04W 40/04* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 8,559,957 B2 | 10/2013 | Hunzinger | |
| 2007/0010271 A1 | 1/2007 | Roy | |
| 2007/0155338 A1* | 7/2007 | Hong | H04B 7/026 455/69 |
| 2010/0046376 A1* | 2/2010 | Zhu | H04W 28/08 370/237 |
| 2011/0081903 A1 | 4/2011 | Cai et al. | |
| 2015/0098392 A1* | 4/2015 | Homchaudhuri | H04W 48/20 370/329 |
| 2015/0181498 A1* | 6/2015 | Li | H04W 36/0094 455/437 |
| 2016/0183271 A1* | 6/2016 | Zhou | H04B 17/309 370/315 |
| 2016/0295380 A1* | 10/2016 | Pitchaiah | H04L 1/16 |
| 2016/0345230 A1 | 11/2016 | Cuevas Ramirez et al. | |
| 2017/0164248 A1* | 6/2017 | Weber | H04W 36/0072 |

* cited by examiner

*Primary Examiner* — George C Atkins (57) ABSTRACT

A method and corresponding system for controlling whether a UE is served by a relay base station, based on consideration of the maximum-supported MCS of the relay base station's associated UE-relay. The method could apply where the UE is already served by the relay base station, in which case the question could be whether the UE continues being served by the relay base station or rather hands over to another base station. Or the method could apply where the UE is not yet being served by the relay base station, in which case the question could be whether the UE should initially attach with or hand over to the relay base station. Further, the method could be carried out by the UE and/or by a base station or other network entity.

19 Claims, 5 Drawing Sheets

CONTROL OF RELAY BASE STATION SERVICE BASED ON MCS CAPABILITY OF ASSOCIATED UE-RELAY

BACKGROUND

A typical wireless communication system includes a number of base stations each radiating to provide one or more coverage areas or "cells" in which to serve user equipment devices (UEs) such as cell phones, tablet computers, tracking devices, embedded wireless modules, and other wirelessly equipped devices (whether or not "user" operated). In turn, each base station may sit as a node on a core access network that includes entities such as a network controller, switches and/or gateways, and the core network may provide connectivity with one or more external transport networks such as the public switched telephone network (PSTN) and the Internet. With this arrangement, a UE within coverage of a base station may engage in air interface communication with the base station and may thereby communicate via the base station with various remote network entities or with other UEs served by the base station.

Such a system may operate in accordance with a particular air interface protocol, with communications from the base stations to UEs defining a downlink and communications from the UEs to the base stations defining an uplink. Examples of existing air interface protocols include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each protocol may define its own procedures for registration of WCDs, initiation of communications, handover between sectors, and other functions.

In practice, each cell in such a system may operate on one or more carrier frequencies and may be structured in accordance with the air interface protocol to define air interface resources for carrying communications between the base station and UEs. For instance, on the downlink, certain resources could be reserved to carry control signaling to UEs, other resources could be reserved to carry bearer data (e.g., application-layer communications) to UEs, and still other resources could be reserved to carry a pilot or reference signal that UEs can detect and measure as a basis to evaluate coverage. And on the uplink, certain resources could be served to carry control signaling from UEs, and other resources could be reserved to carry bearer data from UEs.

When a UE first powers on or enters into coverage of such a system, the UE could search for a strongest cell in which to operate and could then engage in signaling with the base station that provides that cell, and in turn with core network infrastructure, to register or attach for service. In turn, the UE could then be served by the base station in a connected mode or in an idle mode. In the connected mode, the UE may have a radio-link-layer connection with the base station, over which to communicate bearer data (e.g., application-layer data). And in the idle mode, the UE may lack a radio-link-layer connection but may monitor for pages and may transition to the connected mode when necessary to engage in bearer communication.

While so served, the UE may also monitor coverage strength from its serving base station and from adjacent base stations, to help ensure that the UE is served with sufficiently strong coverage and perhaps with the strongest available coverage. If the UE's coverage from its serving base station becomes threshold weak and if another base station's coverage becomes threshold strong (e.g., threshold stronger than the serving base station's coverage), the UE may engage in signaling with its serving base station, and the serving base station may take action to coordinate handover of the UE to the other base station.

Optimally, a wireless service provider will strategically implement base stations throughout a market area so that served UEs can transition between the base stations' coverage areas without loss of coverage. Each base station may include an antenna structure and associated equipment, and the service provider may connect each base station by a landline cable (e.g., a T1 line) with the service provider's core network, to enable the base station to communicate on that network.

In certain locations, however, it may be impractical for a wireless service provider to run landline connections to base stations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To provide coverage in such locations, the wireless service provider may instead implement relay base stations, which could be configured to operate in much the same way as a conventional landline-connected base station but could have a wireless backhaul connection to the core network. In particular, each relay base station could have an associated UE module, referred to as a UE-relay, which would be served by an existing base station of the network, referred to as a donor base station, with the air interface between the UE-relay and the donor base station defining a wireless backhaul connection for the relay base station. With this arrangement, the relay base station could thus conveniently communicate with the core network via the UE-relay, the wireless backhaul connection, and the donor base station.

OVERVIEW

In some situations, a potentially limiting factor in such a relay base station implementation is the UE-relay through which the relay base station communicates with the core network. In particular, as the relay base station serves one or more UEs, all communications between those UEs and the core network, as well as all other communications between the relay base station and the core network, may flow through the UE-relay. Yet the UE-relay may be capable of communicating at only up to a particular data rate on its air interface connection with its serving donor base station. In practice, this data rate limitation could result at least in part from the UE-relay having limited support for modulation of data.

In general, data communication between a base station and a served UE over an air interface may operate in accordance with an agreed modulation and coding scheme (MCS). The MCS could define a coding scheme for encoding the data into an encoded bit sequence at the transmitting end, and for correspondingly decoding the bit sequence to uncover the underlying data at the receiving end. Further, the MCS could define a modulation scheme that establishes how the bits of the encoded sequence will be superimposed onto a carrier signal at the transmitting end, and thus how the bits will be extracted from the carrier signal at the receiving end. For instance, the modulation scheme could provide for mapping groups of bits from the encoded sequence into symbols that represent phase, amplitude, and/or other characteristics for modulating air interface resources.

MCSs could range from low-order to high-order, in terms of how much data can be communicated per air interface resource. A low-order MCS may represent fewer bits per air interface resource, with a lower coding rate and/or with a modulation scheme that maps fewer bits to each symbol. Whereas, a high-order MCS may represent more bits per air interface resource, with a higher coding rate and/or with a modulation scheme that maps more bits to each symbol.

When a base station serves a UE, the base station and the UE may each support various MCSs, and the base station may select a mutually supported MCS to use for their air interface communication, with the selection being based on factors such as the quality of the UE's air interface connection with the base station. For instance, the UE may regularly evaluate its air interface channel conditions and provide the UE with a channel quality report, and the base station may then select a highest-order mutually supported MCS that is compatible with the UE's reported channel conditions. If the UE has poor channel conditions, then the base station may select a relatively low-order MCS, in which case the rate of data communication per air interface resource would be relatively low. Whereas, if the UE has good channel conditions, then the base station may select a relatively high-order MCS, in which case the rate of data communication per air interface resource would be relatively high.

In some relay base station implementations, the UE-relay may have limited MCS support. For instance, due to its radio or antenna configuration or for other reasons, the UE-relay may support only certain relatively low-order modulation schemes, or the UE-relay may not support certain high-order modulation schemes (perhaps modulation schemes developed after deployment of the UE-relay). As a result, when data is to be communicated between the UE-relay and the donor base station, the data rate of that communication per air interface resource may be limited. And as a result of the UE-relay's data rate limitation, the data rate of the relay base station's communication with the core network via the UE-relay may be limited.

Unfortunately, this data rate limitation could pose an issue for the UEs being served by the relay base station. For instance, if a UE served by the relay base station seeks to engage in high-throughput (high-data-rate) communication, such as video streaming or the like, it is possible that the UE-relay may not be able to support that high-data-rate communication, perhaps concurrently with other relay base station communications. In that situation, it may be better to have the UE be served by another base station, perhaps a landline-connected base station or another relay base station whose associated UE-relay supports higher-order MCS.

Accordingly, disclosed herein is a method and corresponding system for controlling whether a UE is served by a relay base station, based on consideration of the maximum-supported MCS of the relay base station's associated UE-relay. The method could apply where the UE is already served by the relay base station, in which case the question could be whether the UE continues being served by the relay base station or rather hands over to another base station. Or the method could apply where the UE is not yet being served by the relay base station, in which case the question could be whether the UE should initially attach with or hand over to the relay base station. Further, the method could be carried out by the UE and/or by a base station or other core network entity.

In one respect, for instance, disclosed is a method for controlling whether a UE is served by a relay base station, where the relay base station has an associated UE-relay that is operable to be served by a donor base station so as to provide wireless backhaul connectivity for the relay base station, and where the UE-relay has a maximum-supported MCS, such as a highest-order supported MCS. In accordance with the disclosure, the method comprises making a decision, based at least on the UE-relay's maximum-supported MCS, of whether the UE should be served by the relay base station. Further, the method then comprises controlling service of the UE in accordance with the decision, including (i) if the decision is that the UE should be served by the relay base station, then, based on the decision, causing the UE to be served by the relay base station and (ii) if the decision is that the UE should not be served by the relay base station, then, based on the decision, causing the UE to be served by a base station other than the relay base station.

Further, in another respect, disclosed is a relay base station operable to serve UEs, where the relay base station has an associated UE-relay that is operable to be served by a donor base station so as to provide wireless backhaul connectivity for the relay base station, and wherein the where the UE-relay has a maximum-supported MCS. In accordance with the disclosure, the relay base station includes a wireless communication interface through which to serve UEs. And the relay base station further includes a controller configured to control handover of a UE that is currently served by the relay base station, where the controller is configured to (a) detect that the UE will engage in high-throughput communication, (b) responsive to detecting that the UE will engage in high-throughput communication, make a decision, based at least on the UE-relay's maximum-supported MCS, of whether to hand over the UE to a base station other than the relay base station, and (c) cause the relay base station to operate in accordance with the decision.

Still further, disclosed is a UE that is configured to control whether it is served by a relay base station, where the relay base station has an associated UE-relay that is operable to be served by a donor base station so as to provide wireless backhaul connectivity for the relay base station, and where the UE-relay has a maximum-supported MCS. In accordance with the disclosure, the UE includes a wireless communication interface for engaging in air interface communication. Further, the UE includes a controller configured to (a) detect that the UE will engage in high-throughput communication, (b) responsive to detecting that the UE will engage in high-throughput communication, make a decision, based at least on the UE-relay's maximum-supported MCS, of whether the UE should be served by the relay base station, and (c) cause the UE to operate in accordance with the decision.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of LTE. It will be understood, however, that principles of the disclosure can extend to apply in other scenarios as well, such as with different LTE configurations or with other air interface protocols altogether. More generally, elements, arrangements, and operations may be added, removed, combined, distributed, reordered, or otherwise modified. In addition, it will be understood that operations described as being performed by one or more entities may be implemented in various ways, such as by one or more processing units executing program instructions for instance.

Figure 1:
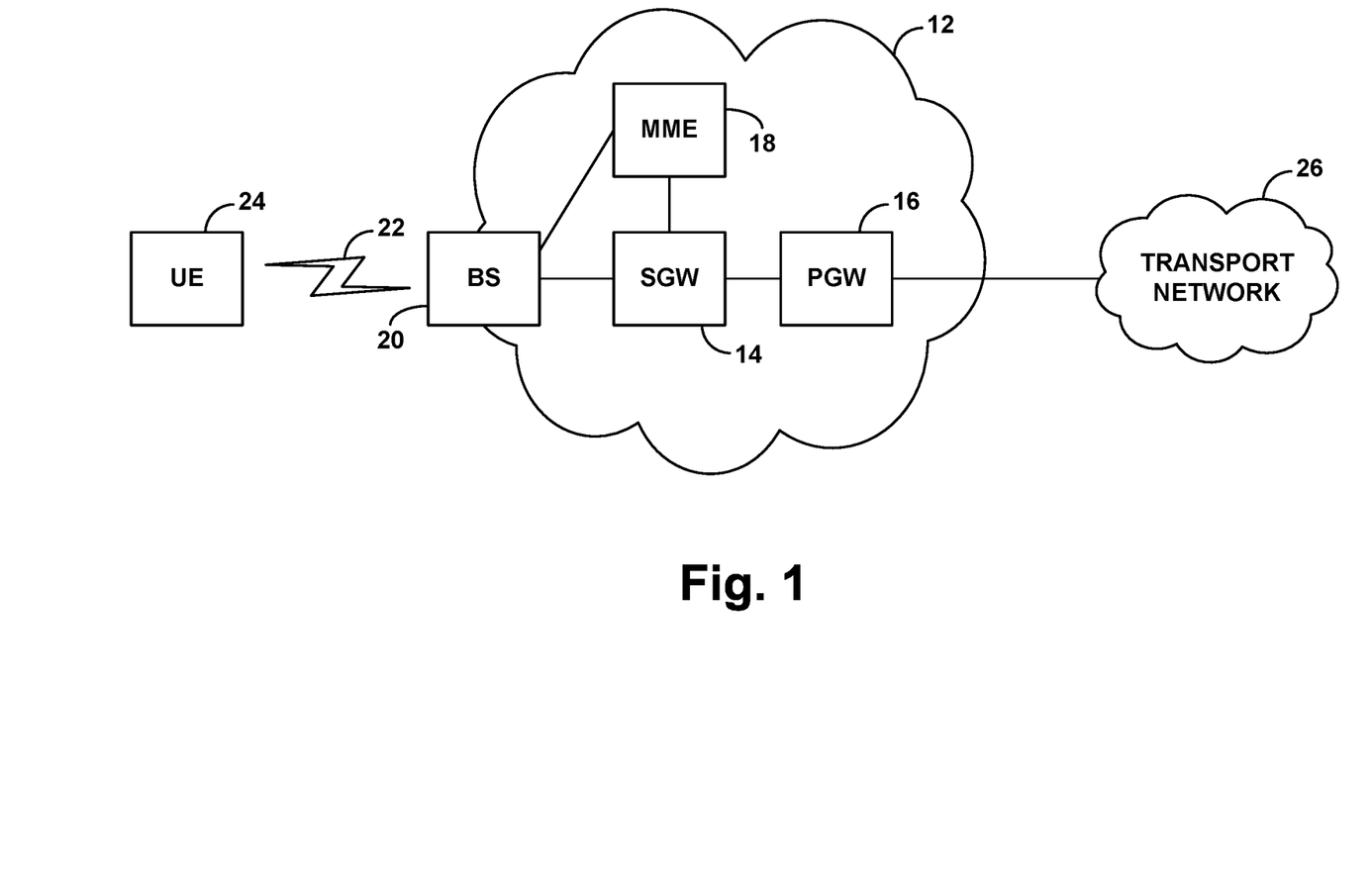
FIG. 1 is a simplified block diagram of an example communication system in which features of the present disclosure can be implemented.

Referring to the drawings, FIG. 1 is a simplified block diagram of an example LTE network. As shown, the LTE network includes a core network 12, which could be structured as a packet-switched network compliant with the industry standard system architecture evolution (SAE) for the LTE protocol. Thus, nodes on the core network could each have an IP address and be configured to communicate with each other over packet-based tunnels or other communication interfaces, some of which could be dynamically configured as needed to serve UEs.

Shown sitting as nodes on core network 12 are then a serving gateway (SGW) 14, a packet-data network gateway (PGW) 16, a mobility management entity (MME) 18, and a representative LTE base station (evolved Node-B (eNodeB)) 20. In practice, the base station 20 could include a wireless communication interface configured to provide a coverage area 22 in which to serve UEs, such as a representative UE 24. The base station 20 could then have a communication interface with the SGW 14 and with the MME 18, the SGW could have a communication interface with the PGW 16, and the PGW could provide connectivity with a transport network 26 such as the Internet.

With this arrangement, when UE 24 initially enters into coverage of base station 20, the UE 24 could engage in signaling to connect with the base station and to register for service, and the MME could coordinate setup of one or more bearer tunnels for carrying data communication between the UE and the PGW, to facilitate UE communication on the transport network. For instance, the MME could coordinate setup of a default bearer for carrying general packet-data communications between the UE and the PGW. And in accordance with a service profile for the UE, the MME could coordinate setup of one or more other bearers for the UE, each having an associated service type and characteristics. Further, the base station could establish in storage a context record for the UE, indicating the bearer type(s) set up for the UE and other service profile information for the UE.

Once the UE is so connected and registered, the UE could then be served by the base station, with the base station coordinating air interface communication with the UE.

In LTE, the air interface spans a frequency bandwidth, such as 5 MHz, 10 MHz, 15 MHz, or 20 MHz (among other possibilities), and is divided over time and frequency into an array of resource elements for carrying data communications between the base station and UEs. In particular, the air interface is divided over time into a continuum of 10-millisecond frames, each of which is divided in turn into ten 1-millisecond subframes, and each subframe is divided into 14 symbol time segments of 66.7 microseconds separated by guard intervals. And the air interface is divided over frequency into as many 15 kHz subcarriers as would fit within the frequency bandwidth. Thus, the air interface defines an array of resource elements each occupying a 15 kHz subcarrier and spanning 66.7 microseconds. And the subcarrier of each of these resource element can be modulated using an agreed modulation scheme to carry data between the base station and UEs.

Various modulation schemes are then possible as noted above, and each modulation scheme could support a respective data rate per LTE resource element. Without limitation, examples of modulation schemes include quadrature phase-shift keying (QPSK), in which each resource element represents 2 bits, 8 phase-shift keying (8PSK), in which each resource element represents 3 bits, 16 quadrature amplitude modulation (16QAM), in which each resource element represents 4 bits, 32QAM, in which each resource element represents 5 bits, 64QAM, in which each resource element represents 6 bits, and 256QAM, in which each resource element represents 8 bits.

When the base station is serving a UE such as UE 24 and the base station has data to communicate to the UE or the UE has data to communicate to the base station, the base station could select an MCS to use for the communication and could coordinate the communication using that MCS. As noted above, for instance, the base station could select an MCS based at least in part on the UE's reported channel quality. Further, the base station could select resource elements (grouped as physical resource blocks) to carry the data. The base station could then send to the UE a control signal that designates the selected MCS and the selected resource elements, and the base station and UE could engage in the communication accordingly.

Figure 2:
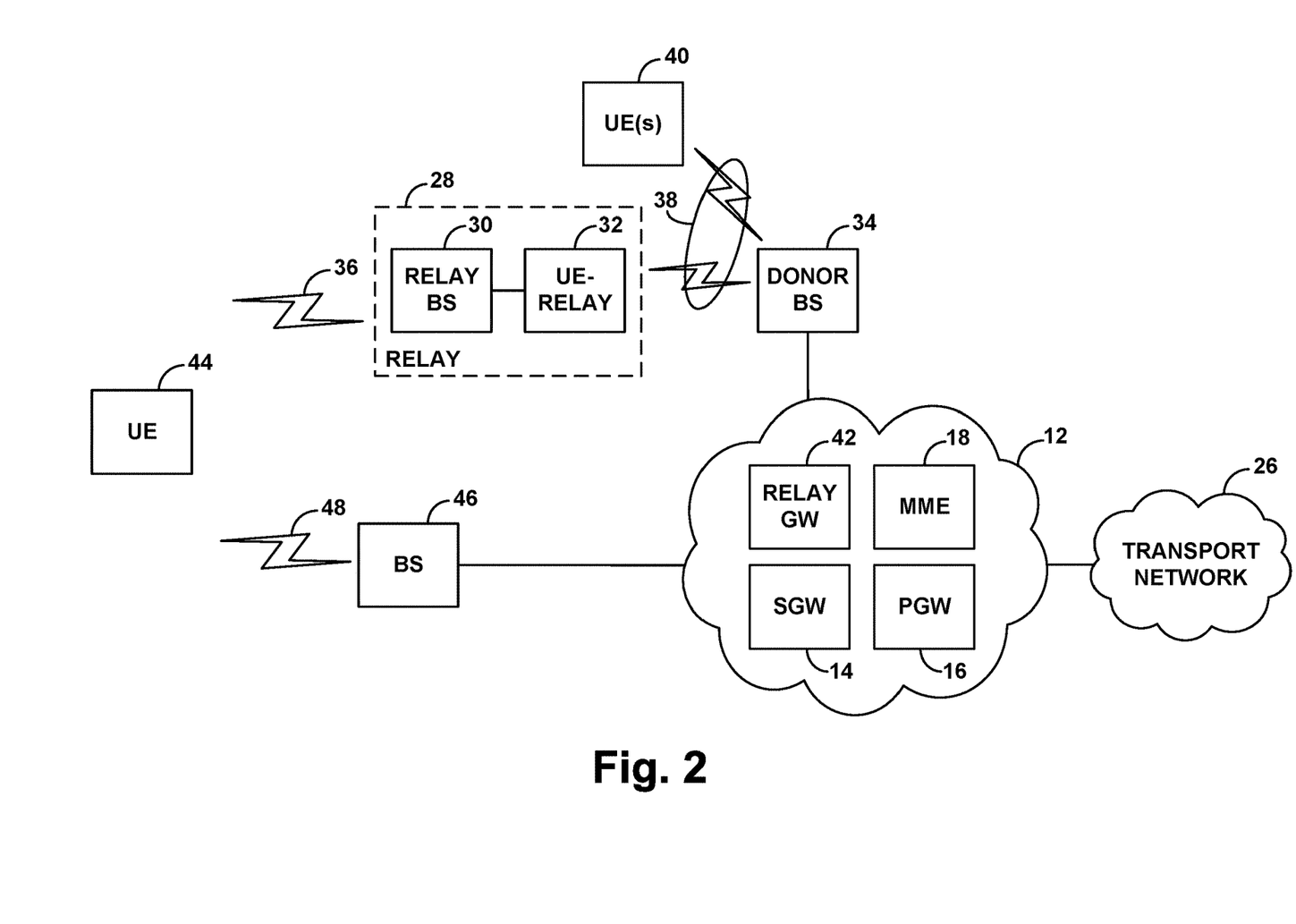
FIG. 2 is another simplified block diagram of an example communication system in which features of the present disclosure can be implemented.

FIG. 2 is next a simplified block diagram of an example LTE network including a representative relay base station arrangement. In particular, FIG. 2 depicts core network 12, including the SGW, PGW, and MME as noted above, and further depicts a representative relay 28, including a relay base station 30 and an associated UE-relay 32, with the UE-relay 32 sitting within coverage of and being served by a donor base station 34 that sits as a node on the core network 12.

The relay base station 30 in this arrangement could be configured to operate much like base station 20 discussed above, providing an LTE coverage area 36 in which to serve UEs. Further, the relay base station 30 could be integrated or communicatively linked with the UE-relay 32 to facilitate obtaining wireless backhaul connectivity with the core network. For instance, relay 28 could be an integral device including both relay base station 30 and UE-relay 32, or relay base station could be interconnected with UE-relay via a local area network or other connection. Further, the donor base station 34 could likewise be configured to operate much like base station 20, providing an LTE coverage area 38 in which to serve UEs, in this case including UE-relay 32 and possibly one or more other UEs 40.

With this arrangement as discussed above, the air interface between donor base station 34 and the UE-relay 32 operates as a wireless backhaul interface for the relay base station 30. Thus, as the relay base station 30 serves one or more UEs, communication between those UEs and the core network 12, as well as any other communications between the relay base station 30 and the core network 12, would flow over that wireless backhaul interface. In particular, when the relay base station 30 has data to send to the core network 12, the relay base station 30 would provide that data to the UE-relay 32, and the donor base station 34 would then coordinate communication of that data over wireless backhaul interface as discussed above. And similarly, when the core network 12 has data to send to the relay base station 30, the donor base station 34 would coordinate communication of that data over the wireless backhaul interface to the UE-relay 32, and the UE-relay 32 would pass the data to the relay base station 30.

To facilitate this communication, the core network 12 could further include a relay gateway 42, and the network could be configured with one or more bearer connections between the UE-relay 32 and the relay gateway 42, for carrying communications between the core network and the relay base station.

In particular, when the relay base station 30 and UE-relay 32 are first put into service, the UE-relay 32 could connect with the donor base station 34 in much the same way any UE would connect with a base station, but the MME could recognize that the UE-relay 32 is functioning as a UE-relay and could therefore coordinate setup of one or more bearers between the UE-relay 32 and the relay gateway 42. In this process, the relay gateway 42 and/or or one or more other core network nodes may also learn the relationship between the relay base station 30 and the UE-relay 32, so that data destined to the relay base station 30 can be sent to the UE-relay 32 for forwarding to the relay base station 30.

As noted above, a UE-relay such as UE-relay 32 might be configured to support using only up to a particular a maximum MCS, such as a maximum order modulation scheme. By way of example, considering the modulation schemes described above, UE-relay 32 might support up to 16QAM but might not support 64QAM or higher. Or UE-relay 32 might support up to 64QAM but might not support 256QAM or higher. As noted above, this restriction could be a result of limitations in the UE-relay's wireless communication interface, such as if the UE-relay has a radio or antenna structure that is not designed to handle higher than a particular order modulation scheme without undue clipping or the other issues. Or this restriction could be a setting in the UE-relay or could be for other reasons.

The UE-relay's maximum supported MCS could be indicated in a service profile record of the UE-relay within the core network and/or could be reported by the UE-relay as part of a capabilities report during the UE-relay's initial attachment or at other times. Consequently, various nodes in the network could have access to this information. For example, the relay gateway 42 may obtain this information at the time the UE initially connects. Further, the relay base station 30 may obtain this information by querying the relay gateway and/or through a direct report from the UE-relay 32.

As noted above, the present disclosure provides for controlling whether a UE is served by a relay base station, based on the maximum supported MCS of the UE-relay that provides wireless backhaul connectivity for the relay base station. In the arrangement of FIG. 2, at issue could be whether a representative UE 44 should be served by relay base station 30, based on a consideration of the maximum supported MCS of UE-relay 32.

As further noted above, the issue could be whether UE 44 should be served by the relay base station 30 or should be served by a base station 46 other than the relay base station 30. The other base station 46 could sit as a node on the core network 12 and could be configured to operate much like base station 20, providing an LTE coverage area 48. And the issue could arise in a scenario where UE 44 is within coverage of both the relay base station 30 and the other base station 46 and is served by one of the base stations or is initially deciding which base station to be served by. Further, the issue could arise specifically in a scenario where the UE is going to engage in a high-throughput communication such as video streaming or the like, because limited MCS support by UE-relay 32 could be problematic especially for such communications.

In one example scenario, UE 44 may be served by base station 46, and base station 46 could face the question of whether to hand over UE 44 to relay base station 30. For instance, UE 44 may have reported poor signal strength from base station 46, base station 46 may have responsively directed UE 44 to scan for better coverage, and UE 44 may have reported to base station 46 that UE 44 detected better coverage from relay base station 30 and perhaps from one or more other base stations. At issue in this scenario is then whether base station 46 should process handover of UE 44 to relay base station 30.

To address this issue, base station 46 could determine that the base station 30 providing the reported coverage is a relay base station, and base station 46 could determine the maximum-supported MCS of the UE-relay associated with that relay base station, i.e., of UE-relay 32. Base station 46 could then decide based at least on that maximum-supported MCS whether to hand over UE 44 to relay base station 30.

Base station 46 could determine in various ways that base station 30 is a relay base station. For example, base station 46 could be pre-provisioned with neighbor list data that lists various neighboring base stations and indicates expressly or implicitly for each one whether the neighboring base station is a relay base station. As another example, base station 46 could query another core network entity, such as an element management system or the like, to ascertain this information.

Given a determination that the base station 30 is a relay base station, base station 46 could then further determine in various ways what the maximum supported MCS is of that relay base station. For example, neighbor list data could also be provisioned with an indication of the maximum-supported MCS of the UE-relay associated with relay base station 30, and so base station 46 could obtain the information from that list. As another example, base station 46 could query another core network entity, such as an element management system, or perhaps relay gateway 42, to ascertain this information.

And the base station 46 could then decide based on the maximum-supported MCS of UE-relay 32 whether to process handover of UE 44 to the relay base station 30. For instance, base station 46 could decide whether the maximum-supported MCS of the UE-relay 32 is lower-order than a predefined threshold order MCS, such as 256QAM or 64QAM for instance. And if the maximum-supported MCS of the UE-relay 32 is lower than that threshold, then the base station 26 can decide to forgo handing over the UE to the relay base station 30. Whereas, if the maximum-supported MCS of the UE-relay 32 is not lower than that threshold, then the base station may decide to process handover of UE 44 to the relay base station 30.

If the decision is to process such handover, then base station 46 could engage in handover signaling via the core network with the relay base station to prepare for the handover and could then direct UE 44 to transition to be served by the relay base station 30. Whereas, if the decision is to not process such handover, then the base station 46 might itself continue serving UE 44 or might decide instead to hand over UE 44 to a different base station.

In addition, base station 46 could condition this process on first deciding that UE 44 will engage in bearer communication of a particular type, such as streaming media communication (e.g., video streaming) or other high-throughput communication. For instance, the base station 46 could detect that UE 44 is currently engaged in the particular type of bearer communication by determining that UE 44 has an established bearer with a quality of service class associated with that type, which suggests that the UE will engage in that type of bearer communication. Or the base station 46 could detect signaling or other communication that indicates UE 44 is going to start engaging in that type of communication.

If base station 46 detects that UE 44 will engage in communication of the particular type, then base station 46 could responsively forgo handing over UE 44 to the relay base station 30 if the maximum-supported MCS of the relay base station's associated UE-relay is threshold low. Whereas, if base station 46 does not detect that UE 44 will engage in communication of the particular type, then base station 46 could simply process the handover if otherwise appropriate.

In another example scenario, UE 44 may be served by relay base station 30, and relay base station 30 could face the question of whether to continue serving UE 44. For instance, UE 44 may have reported detecting strong coverage from base station 46, while UE 44 still has sufficiently strong coverage from the serving relay base station 30. At issue in this scenario is then whether relay base station 30 should continue serving UE 44 or rather whether the relay base station 30 should process handover of UE 44 to base station 46.

To address this issue, relay base station 30 could determine the maximum-supported MCS of its associated UE-relay 32 and could decide based on at least that maximum-supported MCS whether to continue serving UE 44.

Relay base station 30 could determine in various ways what its UE-relay's maximum-supported MCS is. For example, relay base station 30 could be pre-provisioned with this information, perhaps by engineering input at the time the UE-relay 32 and relay base station 30 are put into service. As another example, relay base station 30 could receive a report of this information from the UE-relay. And as still another example, relay base station 30 could query another core network entity, such as relay gateway 42 or an element management system, to ascertain this information.

Relay base station 30 could then decide based on the maximum-supported MCS of UE-relay 32 whether to continue serving UE 44 or rather to hand over UE 44 to base station 46, and could take action accordingly. For instance, relay base station 30 could decide whether the maximum-supported MCS of the UE-relay 32 is lower-order than a predefined threshold order MCS. And if so, then relay base station could responsively process handover of UE 44 to base station 46. Whereas, if not, then relay base station 30 could responsively continue serving UE 44.

Further, as with the scenario above, relay base station 30 could condition this process on a determination that UE 44 will engage in bearer communication of a particular type, such as streaming media communication (e.g., video streaming) or other high-throughput communication. If relay base station 30 detects that UE 44 will engage in communication of the particular type, then relay base station 30 could responsively process handover of UE 44 to base station 46 if the maximum-supported MCS of UE-relay 32 is threshold low. Whereas, if relay base station 30 does not detect that UE 44 will engage in communication of the particular type, then relay base station 30 could simply continue serving UE 44.

In an example variation of this scenario, the act of detecting that UE 44 will engage in communication of the particular type could be a trigger for UE 44 scanning for coverage for possible handover from the relay base station 30. For example, relay base station 30 could detect that UE 44 will engage in communication of the particular type, and relay base station 30 could responsively determine whether the maximum-supported MCS of UE-relay 32 is threshold low. If so, then relay base station 30 may direct UE 44 to scan for coverage. And upon UE 44 then reporting sufficiently strong coverage of base station 46, relay base station 30 could then process handover of UE 44 to base station 46.

In yet another example scenario, UE 44 might not yet be served by either base station 30, 46, but may detect sufficient coverage from both and might therefore face the question of which base station to connect with, either initially or through handover from another serving base station. More specifically, at issue here could be whether E 44 should connect with and thus be served by relay base station 30 or rather whether UE 44 should connect with and thus be served by base station 46.

To address this issue, UE 44 could determine that base station 30 is a relay base station and could determine the maximum-supported MCS of the UE-relay associated with base station 30. And UE 44 could then decide based on at least that maximum-supported MCS whether to connect with relay base station 30.

UE 44 could determine in various ways that base station 30 is a relay base station and, if so, what the maximum-supported MCS is of its associated UE-relay. For example, relay base station 30 could broadcast a system parameter message that specifies it is a relay base station and that indicates the maximum-supported MCS of its associated UE-relay. Alternatively, UE 44 might have stored this information from a previous experience having connected with relay base station 30 and learned the information.

UE 44 could then decide based on the maximum-supported MCS of UE-relay 32 whether to connect with relay base station 30. For instance, UE 44 could decide whether the maximum-supported MCS of the UE-relay 32 is lower-order than a predefined threshold order MCS. And if so, UE 44 could responsively forgo connecting with relay base station 30 and instead could connect with base station 46 or another base station. Whereas, if not, then UE 44 could decide to connect with relay base station 30. In either case, UE 44 could then proceed accordingly.

As with the examples above, UE 44 could condition this process on first detecting that UE 44 will engage in bearer communication of a particular type, such as streaming media communication (e.g., video streaming) or other high-throughput communication. For instance, the reason UE 44 might be seeking a connection in the first place could be that a user of UE 44 has triggered initiation of the particular type of communication. Alternatively, UE 44 might otherwise be engaged in the particular type of communication or be about to start engaging in the particular type of communication and might therefore carry out the above process.

Figure 3:
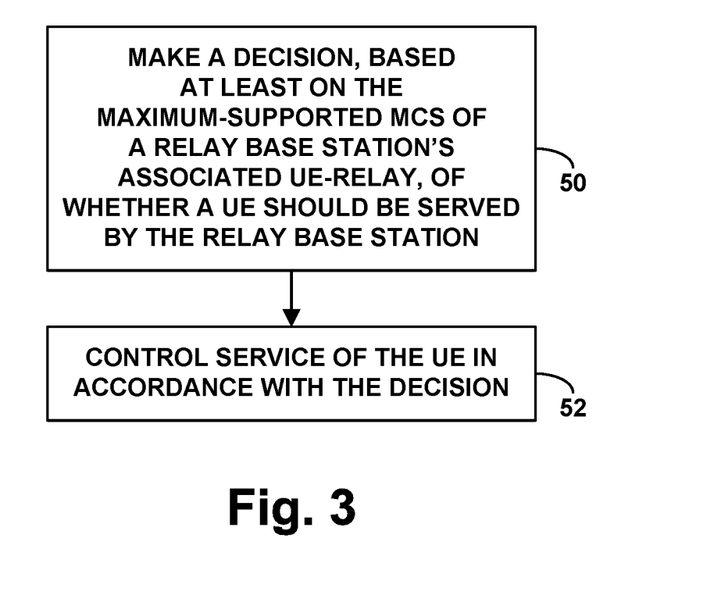
FIG. 3 is a flow chart depicting operations of an example method.

FIG. 3 is next a flow chart depicting operations that can be carried out in accordance with an example method, to control whether a UE is served by a relay base station, where the relay base station has an associated UE-relay that is operable to be served by a donor base station so as to provide wireless backhaul connectivity for the relay base station, and where the UE-relay has a maximum-supported MCS.

As shown in FIG. 3, at block 50, the method includes making a decision, based at least on the UE-relay's maximum-supported MCS, of whether the UE should be served by the relay base station. And at block 52, the method includes controlling service of the UE in accordance with the decision, including (i) if the decision is that the UE should be served by the relay base station, then, based on the decision, causing the UE to be served by the relay base station and (ii) if the decision is that the UE should not be served by the relay base station, then, based on the decision, causing the UE to be served by a base station other than the relay base station.

In line with the discussion above, the UE-relay's maximum-supported MCS could comprise a highest order modulation scheme supported by the UE-relay, in which case the act of making the decision based at least on the UE-relay's maximum-supported MCS could involve making the decision based at least on the highest-order modulation scheme supported by the UE-relay.

Further, as discussed above, the method could additionally include determining that the UE will engage in bearer communication of a particular type (e.g., that the UE is currently engaging in the bearer communication of the particular type, and/or that the UE is going to engage in a communication of the particular type), in which case making the decision based at least on the UE-relay's maximum-supported MCS of whether the UE should be served by the relay base station could be responsive to determining that the UE will engage in bearer communication of a particular type. Moreover, as noted above, the particular type could be high-throughput communication and/or streaming media communication such as video streaming for instance.

In addition, as discussed above, this method could apply in various scenarios. For example, the method could be carried out by the relay base station while the relay base station is serving the UE, in which case the act of making a decision of whether the UE should be served by the relay base station could involve deciding whether the UE should continue to be served by the relay base station. Further, the act of causing the UE to be served by the relay base station could involve causing the UE to continue to be served by the relay base station, and the act of causing the UE to be served by the base station other than the relay base station could involve handing over the UE from being served by the relay base station to being served by the base station other than the relay base station.

As another example, the method could be carried out by a base station that is currently serving the UE, in which case the act of making a decision of whether the UE should be served by the relay base station could involve deciding whether the base station should hand over the UE to the relay base station. Further, causing the UE to be served by the relay base station could involve handing over the UE to the relay base station, and causing the UE to be served by the base station other than the relay base station could involve continuing to serve the UE rather than handing the UE over to the relay base station.

And as still another example, the method could be carried out by the UE, in which case the decision could be whether the UE should initially attach with the relay base station and/or whether the UE should hand over to the relay base station. Other examples are possible as well.

Figure 4:
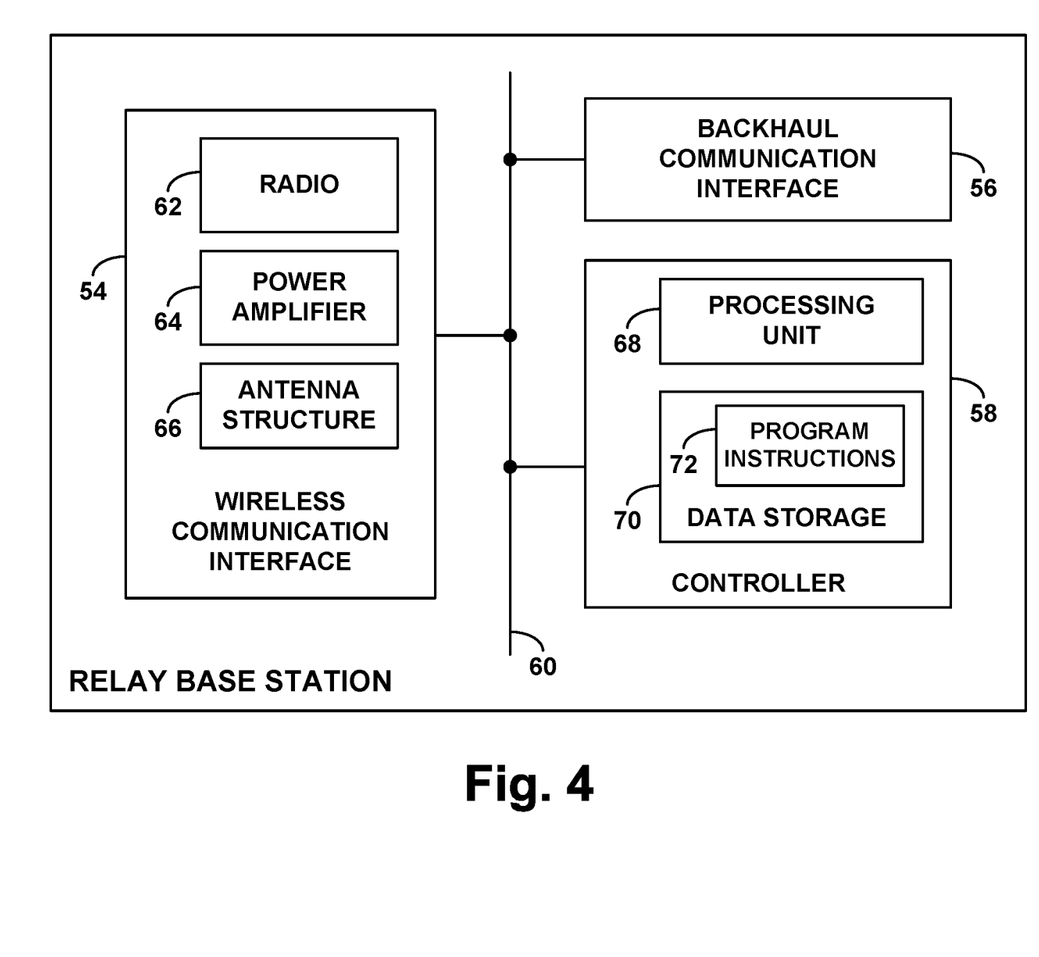
FIG. 4 is a simplified block diagram of an example relay base station.

FIG. 4 is next a simplified block diagram of an example relay base station, showing some of the components that could be included to facilitate carrying out operations described above. In line with the discussion above, the relay base station has an associated UE-relay that is operable to be served by a donor base station so as to provide wireless backhaul connectivity for the relay base station, and the UE-relay has a maximum-supported MCS. And as shown in FIG. 4, the relay base station includes a wireless communication interface 54, a backhaul interface 56, and a controller 58, all of which could be integrated together or otherwise communicatively linked by a system bus, network, or other connection mechanism 60.

Wireless communication interface 54 could include a radio 62, power amplifier 64, and antenna structure 66, cooperatively enabling the relay base station to serve UEs over an air interface. Backhaul interface 56 could comprise a network port through which the relay base station could be interconnected with a UE-relay, if the UE-relay is not integrated as a component with the relay base station. And controller 58 could comprise a processing unit 68 (e.g., one or more microprocessors), non-transitory data storage 70 (e.g., one or more volatile and/or non-volatile storage components), and program instructions 72 stored in the data storage 70 and executable by the processing unit 68 to carry out various relay base station operations described above.

In practice, the controller 58 could thus operate to (a) detect that the UE will engage in high-throughput communication, (b) responsive to detecting that the UE will engage in high-throughput communication, make a decision, based at least on the UE-relay's maximum-supported MCS, of whether to hand over the UE to a base station other than the relay base station, and (c) cause the relay base station to operate in accordance with the decision. For instance, if the decision is to hand over the UE to the base station other than the relay base station, then the controller could cause the relay base station to trigger a measurement report by the UE to facilitate handover and/or could cause the relay base station to process handover of the UE. Other features described above can be applied in this context as well, and vice versa.

Figure 5:
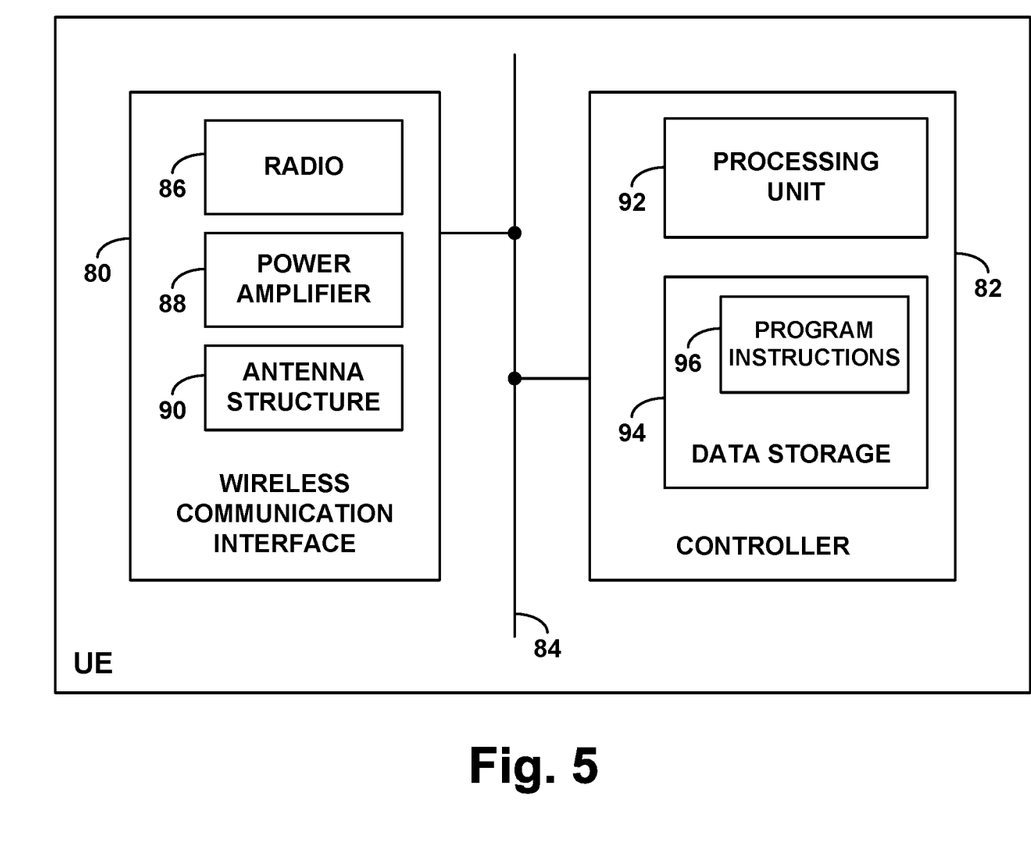
FIG. 5 is a simplified block diagram of an example UE.

Finally, FIG. 5 is a simplified block diagram of an example UE, showing some of the components that could be included to facilitate carrying out operations described above, including controlling whether the UE is served by a relay base station. In line with the discussion above, the relay base station has an associated UE-relay that is operable to be served by a donor base station so as to provide wireless backhaul connectivity for the relay base station, and the UE-relay has a maximum-supported MCS. And as shown, the UE includes a wireless communication interface 80 and a controller 82, which could be integrated together or otherwise communicatively linked by a system bus, network, or other connection mechanism 84.

Wireless communication interface 80 could include a radio 86, power amplifier 88, and antenna structure 90, cooperatively enabling the UE to engage in air interface communication. And controller 82 could comprise a processing unit 92 (e.g., one or more microprocessors), non-transitory data storage 94 (e.g., one or more volatile and/or non-volatile storage components), and program instructions 96 stored in the data storage 94 and executable by the processing unit 92 to carry out various UE operations described above. Other features described above can be applied in this context as well, and vice versa.

In practice, the controller 82 could thus operate to (a) detect that the UE will engage in high-throughput communication, (b) responsive to detecting that the UE will engage in high-throughput communication, make a decision, based at least on the UE-relay's maximum-supported MCS, of whether the UE should be served by the relay base station, and (c) cause the UE to operate in accordance with the decision. Other features described above can be applied in this context as well, and vice versa.

Exemplary embodiments have been described above. Those skilled in the art will understand, however, that changes and modifications may be made to these embodiments without departing from the true scope and spirit of the invention.

We claim:

1. A method for controlling whether a user equipment device (UE) is served by a relay base station, wherein the relay base station has an associated UE-relay that is operable to be served by a donor base station so as to provide wireless backhaul connectivity for the relay base station, and wherein the UE-relay has a maximum-supported modulation and coding scheme (MCS), the method comprising:
   determining that bearer communication in which the UE will engage is of a particular type; and
   responsive to the determining, (a) making a decision, based at least on the UE-relay's maximum-supported MCS, of whether the UE should be served by the relay base station, and (b) controlling service of the UE in accordance with the decision, including (i) if the decision is that the UE should be served by the relay base station, then, based on the decision, causing the UE to be served by the relay base station and (ii) if the decision is that the UE should not be served by the relay base station, then, based on the decision, causing the UE to be served by a base station other than the relay base station.

2. The method of claim 1, wherein the UE-relay's maximum-supported MCS comprises a highest order modulation scheme supported by the UE-relay, and wherein making the decision based at least on the UE-relay's maximum-supported MCS comprises making the decision based at least on the highest-order modulation scheme supported by the UE-relay.

3. The method of claim 1, wherein determining that the bearer communication in which the UE will engage is of the particular type comprises an operation selected from the group consisting of (i) determining that the UE is currently engaging in the bearer communication of the particular type, (ii) determining that the UE is going to engage in a communication of the particular type.

4. The method of claim 3, wherein the particular type is high-throughput communication.

5. The method of claim 3, wherein the particular type is streaming media communication.

6. The method of claim 1, carried out by the relay base station while the relay base station is serving the UE,
   wherein making a decision of whether the UE should be served by the relay base station comprises deciding whether the UE should continue to be served by the relay base station, and
   wherein (i) causing the UE to be served by the relay base station comprises causing the UE to continue to be served by the relay base station, and (ii) causing the UE to be served by the base station other than the relay base station comprises handing over the UE from being served by the relay base station to being served by the base station other than the relay base station.

7. The method of claim 1, carried out by a base station currently serving the UE,
   wherein making a decision of whether the UE should be served by the relay base station comprises deciding whether the base station should hand over the UE to the relay base station, and
   wherein (i) causing the UE to be served by the relay base station comprises handing over the UE to the relay base station, and (ii) causing the UE to be served by the base station other than the relay base station comprises continuing to serve the UE rather than handing the UE over to the relay base station.

8. The method of claim 1, carried out by the UE,
   wherein the decision is one of (i) whether the UE should initially attach with the relay base station and (ii) whether the UE should hand over to the relay base station.

9. A relay base station operable to serve user equipment devices (UEs), wherein the relay base station has an associated UE-relay that is operable to be served by a donor base station so as to provide wireless backhaul connectivity for the relay base station, and wherein the UE-relay has a maximum-supported modulation and coding scheme (MCS), the relay base station comprising:
   a wireless communication interface through which to serve UEs; and
   a controller configured to control handover of a UE that is currently served by the relay base station, wherein the controller is configured to (a) detect that the UE will engage in high-throughput communication, (b) responsive to detecting that the UE will engage in high-throughput communication, make a decision, based at least on the UE-relay's maximum-supported MCS, of whether to hand over the UE to a base station other than the relay base station, and (c) cause the relay base station to operate in accordance with the decision.

10. The relay base station of claim 9, wherein the controller comprises a processing unit, non-transitory data storage, and program instructions stored in the non-transitory data storage and executable by the processing unit to carry out the detecting, the making of the decision, and the causing.

11. The relay base station of claim 9, wherein detecting that the UE will engage in high-throughput communication comprises an operation selected from the group consisting of (i) determining that the UE is currently engaging in high-throughput communication, (ii) determining that the UE is going to engage in high-throughput communication.

12. The relay base station of claim 9, wherein high-throughput communication comprises streaming media communication.

13. The relay base station of claim 9, wherein if the decision is to hand over the UE to the base station other than the relay base station, then causing the relay base station to operate in accordance with the decision comprises an operation selected from the group consisting of (i) causing the relay base station to trigger a measurement report by the UE to facilitate handover and (ii) causing the relay base station to process handover of the UE.

14. A user equipment device (UE) configured to control whether the UE is served by a relay base station, wherein the relay base station has an associated UE-relay that is operable to be served by a donor base station so as to provide wireless backhaul connectivity for the relay base station, and wherein the UE-relay has a maximum-supported modulation and coding scheme (MCS), the UE comprising:
   a wireless communication interface for engaging in air interface communication; and
   a controller, wherein the controller is configured to (a) detect that the UE will engage in high-throughput communication, (b) responsive to detecting that the UE will engage in high-throughput communication, make a decision, based at least on the UE-relay's maximum-supported MCS, of whether the UE should be served by the relay base station, and (c) cause the UE to operate in accordance with the decision.

15. The UE of claim 14, wherein the controller comprises a processing unit, non-transitory data storage, and program instructions stored in the non-transitory data storage and executable by the processing unit to carry out the detecting, the making of the decision, and the causing.

16. The UE of claim 14, wherein the UE-relay's maximum-supported MCS comprises a highest order modulation scheme supported by the UE-relay, and wherein making the decision based at least on the UE-relay's maximum-supported MCS comprises making the decision based at least on the highest-order modulation scheme supported by the UE-relay.

17. The UE of claim 14, wherein detecting that the UE will engage in high-throughput communication comprises an operation selected from the group consisting of (i) determining that the UE is currently engaging in high-throughput communication, (ii) determining that the UE is going to engage in high-throughput communication.

18. The UE of claim 14, wherein high-throughput communication comprises streaming media communication.

19. The UE of claim 14, wherein the decision is one of (i) whether the UE should initially attach with the relay base station and (ii) whether the UE should hand over to the relay base station.

* * * * *